United States Patent [19]
Wu

[11] Patent Number: 6,082,756
[45] Date of Patent: Jul. 4, 2000

[54] SUPPORTING FRAME STRUCTURE OF A GOLF CART

[76] Inventor: David Wu, No. 35-1, Jih Hsin Street, Tu Cheng Hsiang, Taipei Hsien, Taiwan

[21] Appl. No.: 09/175,991

[22] Filed: Oct. 21, 1998

[51] Int. Cl.[7] .............................. A63B 55/08; B63B 1/00
[52] U.S. Cl. ................................... 280/646; 280/DIG. 6; 248/96
[58] Field of Search .................... 280/645, 646, 280/651, 652, DIG. 6, 47.24; 248/96, 98, 129

[56] References Cited

U.S. PATENT DOCUMENTS

| | | | |
|---|---|---|---|
| 4,793,622 | 12/1988 | Sydlow | 280/40 |
| 5,180,087 | 1/1993 | Lee | 224/274 |
| 5,180,184 | 1/1993 | Chiu | 280/646 |
| 5,704,629 | 1/1998 | Wu | 280/646 |
| 5,725,351 | 3/1998 | Guibert et al. | 414/646 |
| 5,788,261 | 8/1998 | Wu | 280/646 |

*Primary Examiner*—J. J. Swann
*Assistant Examiner*—Christopher D Bottorff
*Attorney, Agent, or Firm*—Dougherty & Troxell

[57] ABSTRACT

A supporting frame structure including two supporting frames bilaterally connected between a bracket on a main rod member of a golf cart and two wheel holder frames, which each hold a wheel, each supporting frame formed of a first frame bar and a second frame bar pivotably connected in parallel between the bracket and one wheel holder frame, wherein the first frame of each supporting frame has a beveled peripheral side wall, the second frame bar of each supporting frame has a beveled peripheral side wall facing the beveled peripheral side wall of the corresponding first frame bar and spaced from the beveled peripheral side wall of the corresponding first frame bar by a gap; the beveled peripheral side walls of the first frame bars of the supporting frames are forced downwards into close contact with the beveled peripheral side walls of the respective second frame bars to support the golf cart on the wheels stably.

1 Claim, 2 Drawing Sheets

SUPPORTING FRAME STRUCTURE OF A GOLF CART

BACKGROUND AND SUMMARY OF THE INVENTION

The present invention relates to a golf cart, and more specifically to supporting frame structure for a golf cart which supports the golf cart on wheels stably.

FIG. 1 shows a regular golf cart. This structure of golf cart comprises a main rod member, a handlebar connected to the front end of the main rod member, and upper bag cradle and a lower bag cradle respectively mounted on the main rod member for carrying a golf bag, a bracket mounted on the main rod member between the upper bag cradle and the lower bag cradle, two wheel holder frames, two wheels respectively mounted on the wheel holder frames, two supporting frames bilaterally pivotably coupled between the bracket and the wheel holder frames, and two links bilaterally pivotably coupled between the upper bag cradle and the supporting frames. The supporting frames each comprises two frame bars. The frame bars each have a top end respectively pivoted to the bracket by a respective pivot, and a bottom end respectively pivoted to the wheel holder frames by a respective pivot. Because the frame bars form with the bracket and the corresponding wheel holder frame a parallelogram, the connections between the frame bars and the bracket/wheel holder frames wear quickly with use, thereby causing the golf cart unable to be stably moved on the uneven ground surface in a golf course. Furthermore, because a big gap is left between the frame bars of each supporting frame when the golf cart bears a heavy load, the sense of beauty of the golf cart is destroyed.

The present invention has been accomplished to provide a supporting frame structure for a golf cart which eliminates the aforesaid drawbacks. According to the present invention, the supporting frame structure comprises a bracket fixedly mounted on a main rod member of a golf cart, two wheel holder frames each holding a wheel, and two supporting frames respectively pivotably connected between the bracket and the wheel holder frames at two opposite sides of the main rod member by pivot means. The supporting frames each comprises a first frame bar and a second frame bar arranged in parallel. The first frame bar has a beveled peripheral side wall. The second frame bar has a beveled peripheral side wall facing the beveled peripheral side wall of the corresponding first frame bar and spaced from the beveled peripheral side wall of the corresponding first frame bar by a gap. The beveled peripheral side walls of the first frame bars of the supporting frames are forced downwards into close contact with the beveled peripheral side walls of the respective second frame bars to support the golf cart on the wheels when the golf cart is extended out, and a load is carried on the main rod member of the golf cart. Because the beveled peripheral side walls of the first frame bars are matched with the beveled peripheral side walls of the second frame bars respectively, no gap is left between the first frame bars and the second frame bars. Therefore, the sense of beauty of the golf cart is maintained intact when the golf cart is extended out.

DETAILED DESCRIPTION OF THE PREFERRED EMBODIMENT

Figure 1:
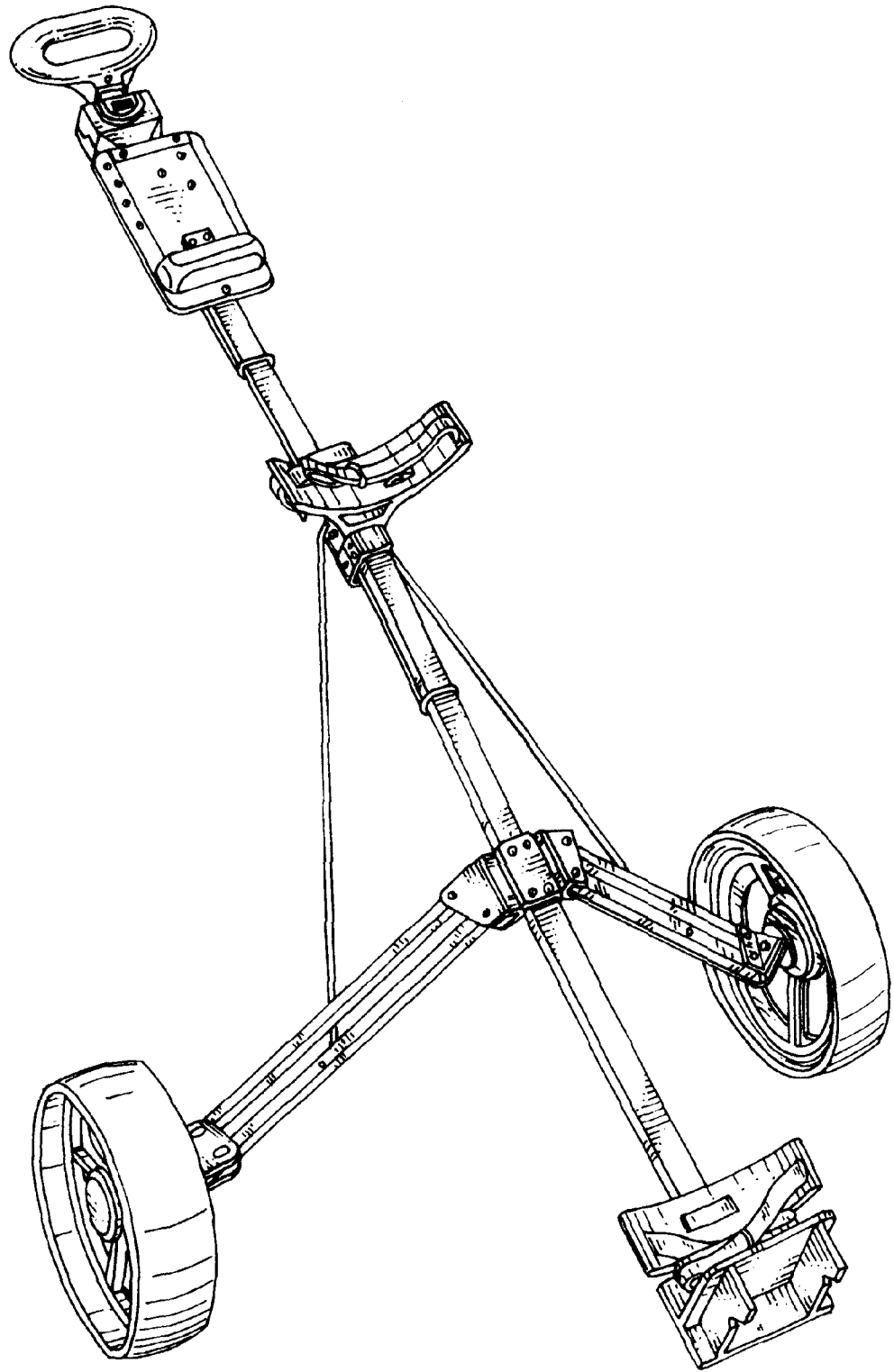
FIG. 1 is a perspective view of a golf cart according to the prior art.
Figure 2:
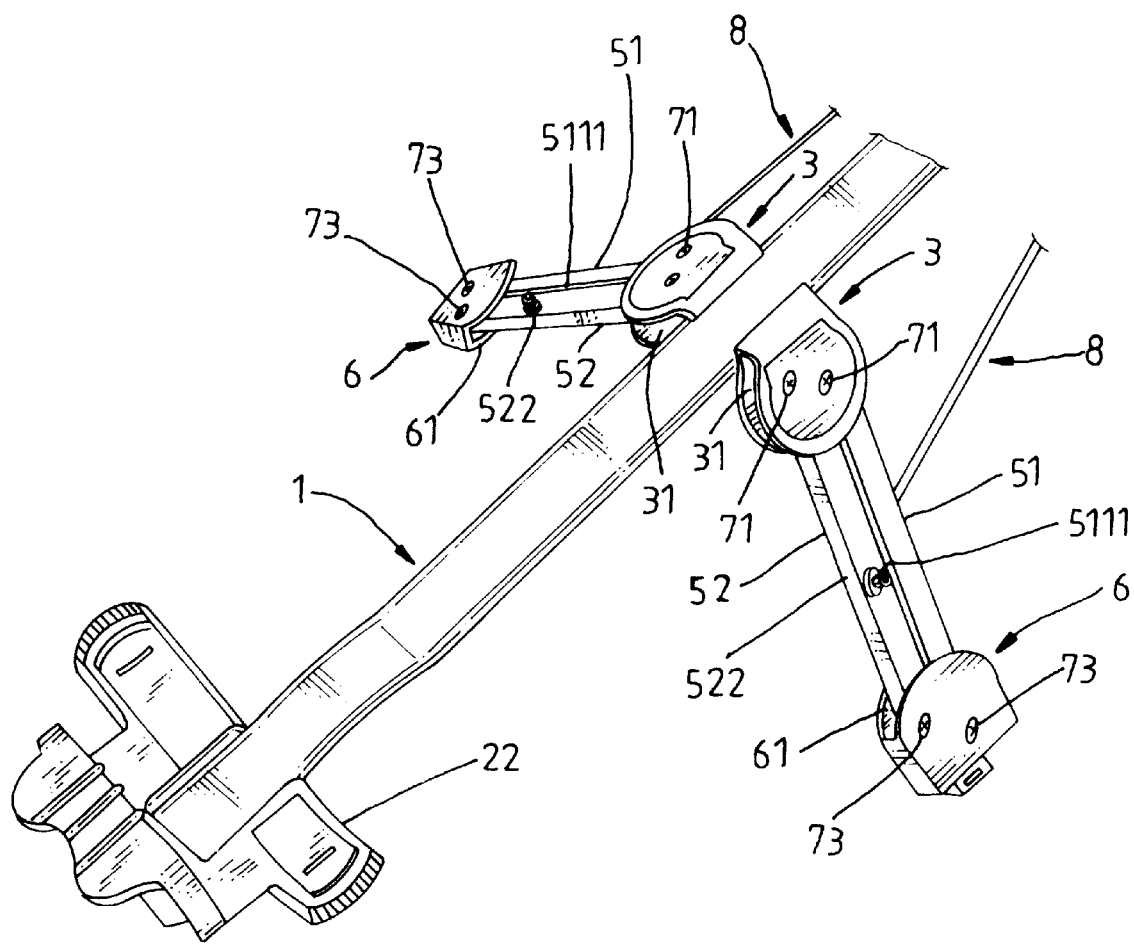
FIG. 2 is a perspective view of a part of the frame structure of a golf cart constructed according to the present invention.

Referring to FIG. 2, a golf cart in accordance with the present invention is generally comprised of a main rod member 1, an upper bag cradle (not shown) and a lower bag cradle fixedly mounted on the main rod member for holding a golf bag, a bracket 3 fixedly mounted on the main rod member 1 between the upper bag cradle and the lower bag cradle 22, two wheel holder frames 6, two wheels (not shown) respectively mounted on the wheel holder frames 6, two supporting frames bilaterally coupled between the bracket 3 and the wheel holder frames 6, each supporting frame formed of two parallel frame bars namely the first frame bar 51 and the second frame bar 52, a handlebar (not shown) longitudinally coupled to the front end of the main rod member 1, and two links 8 bilaterally coupled between the second frame bars 52 and the upper bag cradle. The bracket 3 comprises two substantially U-shaped coupling frames 31. The frame bars 51, 52 each have a top end respectively pivoted to the U-shaped coupling frames 31 by a respective pivot 71, and a bottom end respectively pivoted to the U-shaped coupling frames 61 of the wheel holder frames 6 by a respective pivot 73. The links 8 each have a front end respectively pivoted to the upper bag cradle, and a bottom end respectively pivoted to the second frame bars 52 by a respective pivot 522.

Figure 3:
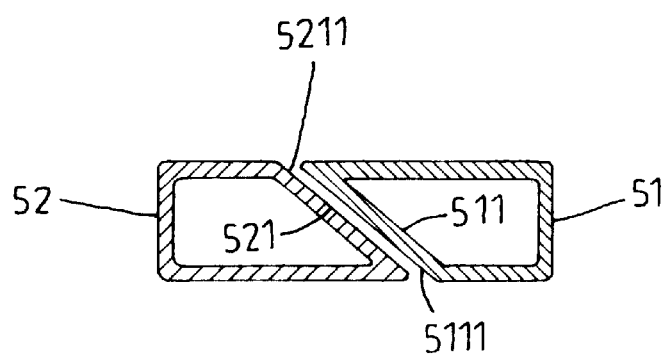
FIG. 3 is a cross-sectional view in an enlarged view of one supporting frame of the frame structure shown in FIG. 2.

Referring to FIGS. 3 and 2 again, the first frame bar 51 of each supporting frame has a beveled peripheral side wall 511 facing the corresponding second frame bar 52. The second frame bar 52 of each supporting frame has a beveled peripheral side wall 521 matching the beveled peripheral side wall 511 of the corresponding first frame bar 51, and spaced from it by a gap. When the golf cart is extended out to carry a golf bag, the gravity weight of the golf bag and the golf clubs in the golf bag imparts a downward pressure to the bracket 3, causing the first frame bars 51 to be respectively forced downwards against the second frame bars 52. When the first frame bars 51 are forced downwards, the beveled peripheral side walls 511 of the first frame bars 51 and the beveled peripheral side walls 521 of the second frame bars 52 are respectively matched together. When the beveled peripheral side walls 511 of the first frame bars 51 and the beveled peripheral side walls 521 of the second frame bars 51 are respectively matched together, no gap exits between the beveled peripheral side walls 511, 521, and only a lower 5111 part of the beveled peripheral side walls 511 of the first frame bars 51 and an upper part 5211 of the beveled peripheral side walls 521 of the second frame bars 52 are visible. Therefore, the golf cart is stably supported on the wheels.

The aforesaid frame bars 51, 52 can be extruded from aluminum. Alternatively, the frame bars 51, 52 can be made of iron tubes or metal alloy tubes.

I claim:

1. The golf cart supporting frame structure comprising a bracket fixedly mounted on a main rod member (of a golf cart), two wheel holder frames each holding a wheel, and two supporting frames, each of said two supporting frames pivotally connected between said bracket and one of said wheel holder frames at (two) opposite sides of said main rod member by at least one pivot means, said two supporting frames each comprising a first frame bar and a second frame bar arranged in parallel, wherein the first frame bar of each of said two supporting frames has a beveled peripheral side wall, and the second frame bar of each of said two supporting frames has a beveled peripheral side wall facing the beveled peripheral side wall of the corresponding first frame bar, said second frame bar being spaced from the beveled peripheral side wall of the corresponding first frame bar by a gap; the beveled peripheral side wall(s) of the first frame bar(s) of each of said two supporting frames (are) is forced downwards into close contact with the beveled peripheral side wall(s) of the respective second frame bar(s) when the golf cart is extended out and a load is carried on the main rod member of the golf cart.

* * * * *